United States Patent
Kumar et al.

(10) Patent No.: US 10,970,771 B2
(45) Date of Patent: Apr. 6, 2021

(54) METHOD, DEVICE, AND NON-TRANSITORY COMPUTER READABLE MEDIUM FOR UTILIZING A MACHINE LEARNING MODEL TO DETERMINE INTERESTS AND RECOMMENDATIONS FOR A CUSTOMER OF A MERCHANT

(71) Applicant: Capital One Services, LLC, McLean, VA (US)

(72) Inventors: Lokesh Vijay Kumar, Frisco, TX (US); Sasi Kumar Unnikrishnan, Plano, TX (US); Venkata Satya Parcha, McKinney, TX (US); Satish Chikkaveerappa, McKinney, TX (US); Ponnazhakan Subramanian, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/506,620

(22) Filed: Jul. 9, 2019

(65) Prior Publication Data
US 2021/0012407 A1 Jan. 14, 2021

(51) Int. Cl.
*G06Q 30/00* (2012.01)
*G06Q 30/06* (2012.01)
(Continued)

(52) U.S. Cl.
CPC ....... *G06Q 30/0631* (2013.01); *G06K 9/6267* (2013.01); *G06N 20/00* (2019.01); *G06Q 30/0621* (2013.01)

(58) Field of Classification Search
CPC .................................... G06Q 30/0601–0645
(Continued)

(56) References Cited

U.S. PATENT DOCUMENTS

| 10,692,127 B1 * | 6/2020 | Kumar | G06N 7/005 |
| 2015/0220951 A1 * | 8/2015 | Kurapati | G06Q 30/0204 705/7.33 |

(Continued)

OTHER PUBLICATIONS

Yin, C., Ding, S. & Wang, J. Mobile marketing recommendation method based on user location feedback. Hum. Cent. Comput. Inf. Sci. 9, 14 (May 2019). https://doi.org/10.1186/s13673-019-0177-6 (Year: 2019).*

*Primary Examiner* — Allison G Wood
*Assistant Examiner* — Jason B Warren
(74) *Attorney, Agent, or Firm* — Harrity & Harrity, LLP

(57) ABSTRACT

A device may receive third-party data associated with merchants and may receive customer interest data associated with customers of the merchants, wherein the customer interest data includes data identifying locations of the customers and birthdates of the customers. The device may train a machine learning model, with the third-party data and the customer interest data, to generate a trained machine learning model. The device may receive, from a user device, data identifying a location and a birthdate of a particular customer of a particular merchant, wherein the particular merchant is one of the merchants, and may process the data identifying the location and the birthdate of the particular customer, with the trained machine learning model, to determine a predicted interest of the particular customer. The device may perform one or more actions based on the interest of the particular customer.

20 Claims, 14 Drawing Sheets

(51) Int. Cl.
*G06K 9/62* (2006.01)
*G06N 20/00* (2019.01)

(58) Field of Classification Search
USPC .............................................. 705/26.1–27.2
See application file for complete search history.

(56) References Cited

U.S. PATENT DOCUMENTS

2017/0236160 A1* 8/2017 Oberoi ............... G06Q 30/0269
                                                          705/14.66
2018/0211270 A1* 7/2018 Wu ..................... G06Q 30/0269

* cited by examiner

METHOD, DEVICE, AND NON-TRANSITORY COMPUTER READABLE MEDIUM FOR UTILIZING A MACHINE LEARNING MODEL TO DETERMINE INTERESTS AND RECOMMENDATIONS FOR A CUSTOMER OF A MERCHANT

BACKGROUND

Customer interest is crucial to selling a product or a service. Obtaining customer interest in the product or the service can be done in initial stages of a sales process, but interest in the product or the service needs to be maintained throughout the sales process.

SUMMARY

According to some implementations, a method may include receiving third-party data associated with merchants, wherein the third-party data may include data associated with one or more of: one or more products of the merchants, one or more services of the merchants, one or more offers provided by the merchants, or one or more financing options offered by the merchants. The method may include receiving customer interest data associated with customers of the merchants, wherein the customer interest data may include data identifying locations of the customers, and birthdates of the customers. The method may include training a machine learning model, with the third-party data and the customer interest data, to generate a trained machine learning model, and receiving, from a user device, data identifying a location and a birthdate of a particular customer of a particular merchant, wherein the particular merchant is one of the merchants. The method may include processing the data identifying the location and the birthdate of the particular customer, with the trained machine learning model, to determine an interest of the particular customer, and performing one or more actions based on the interest of the particular customer.

According to some implementations, a device may include one or more memories; and one or more processors, communicatively coupled to the one or more memories, configured to receive, from a user device, data identifying a location and a birthdate of a particular customer of a particular merchant. The one or more processors may process the data identifying the location and the birthdate of the particular customer, with a trained machine learning model, to determine an interest of the particular customer, wherein a machine learning model may be trained, with data associated with merchants and customer interest data associated with customers of the merchants, to generate the trained machine learning model, wherein the particular merchant may be one of the merchants, wherein the data associated with the merchants may include data associated with one or more of: products of the merchants, services of the merchants, offers provided by the merchants, or financing options offered by the merchants, and wherein the customer interest data may include data identifying locations of the customers and birthdates of the customers. The one or more processors may perform one or more actions based on the interest of the particular customer, wherein, when performing the one or more actions, the one or more processors may one or more of provide, to the user device, data identifying a recommendation for the particular customer and associated with the particular merchant, provide, to the user device, data identifying an offer for the particular customer and associated with the particular merchant, restrict use, by the user device, of a website associated with the particular merchant, or preapprove the particular customer for a transaction with the particular merchant.

According to some implementations, a non-transitory computer-readable medium may store one or more instructions that, when executed by one or more processors of a device, may cause the one or more processors to receive third-party data associated with merchants, wherein the third-party data may include data associated with one or more of products of the merchants, services of the merchants, offers provided by the merchants, or financing options offered by the merchants. The one or more instructions may cause the one or more processors to receive customer interest data associated with customers of the merchants, wherein the customer interest data may include data identifying locations of the customers, and birthdates of the customers. The one or more instructions may cause the one or more processors to train a machine learning model, with the third-party data and the customer interest data, to generate a trained machine learning model, and receive, from a user device, data identifying a location and a birthdate of a particular customer of a particular merchant, wherein the particular merchant may be one of the merchants. The one or more instructions may cause the one or more processors to process the data identifying the location and the birthdate of the particular customer, with the trained machine learning model, to determine an interest of the particular customer, and perform one or more actions based on the interest of the particular customer, wherein the one or more instructions, that cause the one or more processors to perform the one or more actions, may cause the one or more processors to one or more of provide, to the user device, data identifying a recommendation for the particular customer and associated with the particular merchant, provide, to the user device, data identifying an offer for the particular customer and associated with the particular merchant, restrict use, by the user device, of a website associated with the particular merchant, or preapprove the particular customer for a transaction with the particular merchant.

DETAILED DESCRIPTION

The following detailed description of example implementations refers to the accompanying drawings. The same reference numbers in different drawings may identify the same or similar elements.

Obtaining and/or maintaining customer interest in a product or a service may require a merchant to provide offers for the product or the service based on an assumption that customers are interested in the product or the service. If there is no customer interest in the product or the service of the merchant, the merchant may not realize that there is no customer interest in the product or the service until significant resources (e.g., processing resources, memory resources, network resources, manufacturing resources, transportation resources, and/or the like) of the merchant are wasted producing and promoting the product or the service. Customers may also waste resources (e.g., processing resources, memory resources, network resources, transportation resources, and/or the like) reviewing offers for products or services of no interest to the customers.

Some implementations described herein provide a recommendation platform that utilizes a machine learning model to determine interests and recommendations for a customer of a merchant. For example, the recommendation platform may receive third-party data associated with merchants and customer interest data associated with customers of the merchants. The third-party data may include data associated with products of the merchants, services of the merchants, offers provided by the merchants, financing options offered by the merchants, and/or the like. The customer interest data may include data identifying locations of the customers and birthdates of the customers. The recommendation platform may train a machine learning model, with the third-party data and the customer interest data, to generate a trained machine learning model, and may receive, from a user device, data identifying a location and a birthdate of a particular customer of a particular merchant. The recommendation platform may process the data identifying the location and the birthdate of the particular customer, with the trained machine learning model, to determine an interest of the particular customer, and may perform one or more actions based on the interest of the particular customer.

In this way, the recommendation platform enables a merchant to predict customer interest in a product or a service before wasting additional resources (e.g., processing resources, memory resources, network resources, manufacturing resources, transportation resources, and/or the like) producing and/or promoting a product or a service in which customers are not interested. Furthermore, the customers may more effectively utilize resources to identify products or services that may be of interest to them.

Figure 1A:
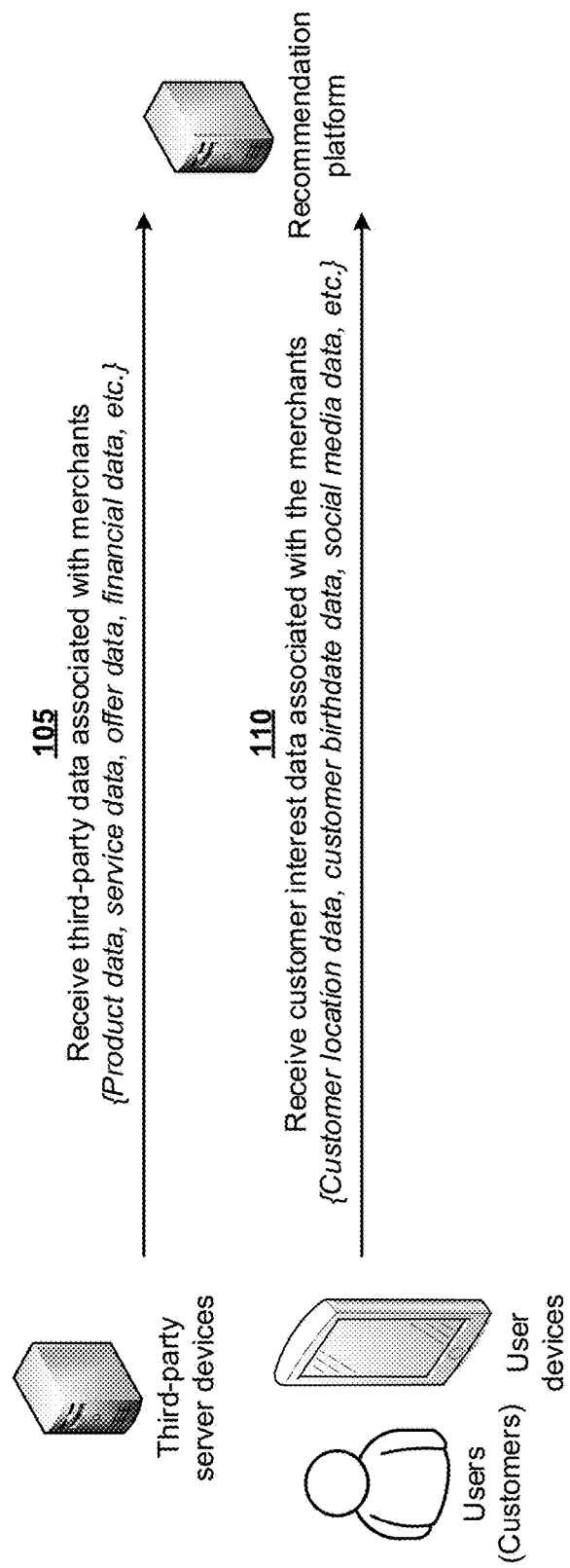
FIGS. 1A-1I are diagrams of one or more example implementations described herein.

FIGS. 1A-1I are diagrams of one or more example implementations 100 described herein. As shown in FIG. 1A, user devices and third-party server devices may be associated with a recommendation platform. As further shown, the user devices may be associated with users (e.g., actual customers of merchants that provide products, services, offers for products and/or services, recommendations for products and/or services, potential customers of merchants, and/or the like). The third-party server devices may be associated with social media services, merchants, financial institutions, and or the like.

As further shown in FIG. 1A, and by reference number 105, the recommendation platform may receive or access, from the third-party server devices, third-party data associated with the merchants. In some implementations, the third-party data may include social media data (e.g., data identifying inputs of the customers, and associated with the merchants, on social media websites, blogs, news websites, and/or the like), product data identifying products of the merchants, service data identifying services of the merchants, offer data identifying offers of the merchants for the products and/or the services, and/or the like, recommendation data identifying recommendations of the merchants for the products and/or the services, financial data identifying financing options available for the products and/or the services of the merchants, and/or the like. The third-party data may be received based on monitoring social media accounts of the customers, may be received from specific merchants, financial institutions, and/or the like, may be received from the Internet, and/or the like.

In some implementations, the recommendation platform may actively monitor social media websites (e.g., Facebook, Twitter, and/or the like) for posts relating to products and/or services of an organization (e.g., a merchant), merchant websites associated with the products and/or services of a merchant, and/or the like. The monitoring of the social media websites and merchant websites may include the recommendation platform performing one or more searches periodically (e.g., hourly, daily, weekly, and/or the like) for information being posted about the products and/or services, and determining whether the posts are positive or negative. In some implementations, the recommendation platform may utilize a machine learning model, as described below, to determine whether posts are positive or negative.

In some implementations, the recommendation platform may periodically receive or access the third-party data from the third-party server devices, may continuously receive or access the third-party data from the third-party server devices, and/or the like. In some implementations, the recommendation platform may store the third-party data in a data structure (e.g., a database, a table, a list, and/or the like) associated with the recommendation platform.

As further shown in FIG. 1A, and by reference number 110, the recommendation platform may receive or access, from the user devices, customer interest data associated with the merchants. In some implementations, the customer interest data may include customer location data identifying locations of the customers (e.g., current locations, resident locations, birthplace locations, and/or the like), customer birthdate data identifying birthdates of the customers, direct customer input data (e.g., data identifying products and/or services of the merchants that is input by the customers via the user devices), social media data (e.g., data identifying products and/or services of the merchants on social media accounts of the customers, blogs of the customers, and/or the like), transaction data associated with the customers (e.g., data identifying transactions between the customers and the merchants), website activity data associated with the customers (e.g., data identifying customer interactions with websites provided by the merchants), and/or the like. In some implementations, the recommendation platform may periodically receive or access the customer interest data from the user devices, may continuously receive or access the customer interest data from the user devices, and/or the like. In some implementations, the recommendation platform may store the customer interest data in a data structure (e.g., a database, a table, a list, and/or the like) associated with the recommendation platform.

In some implementations, the recommendation platform may collect, store, and use personal information provided by individuals in accordance with all applicable laws concerning protection of personal information. Additionally, the collection, storage, and use of personal information may be subject to consent of the individual to such activity (e.g., via "opt-in" or "opt-out" processes as may be appropriate for the situation and type of information).

Figure 1B:
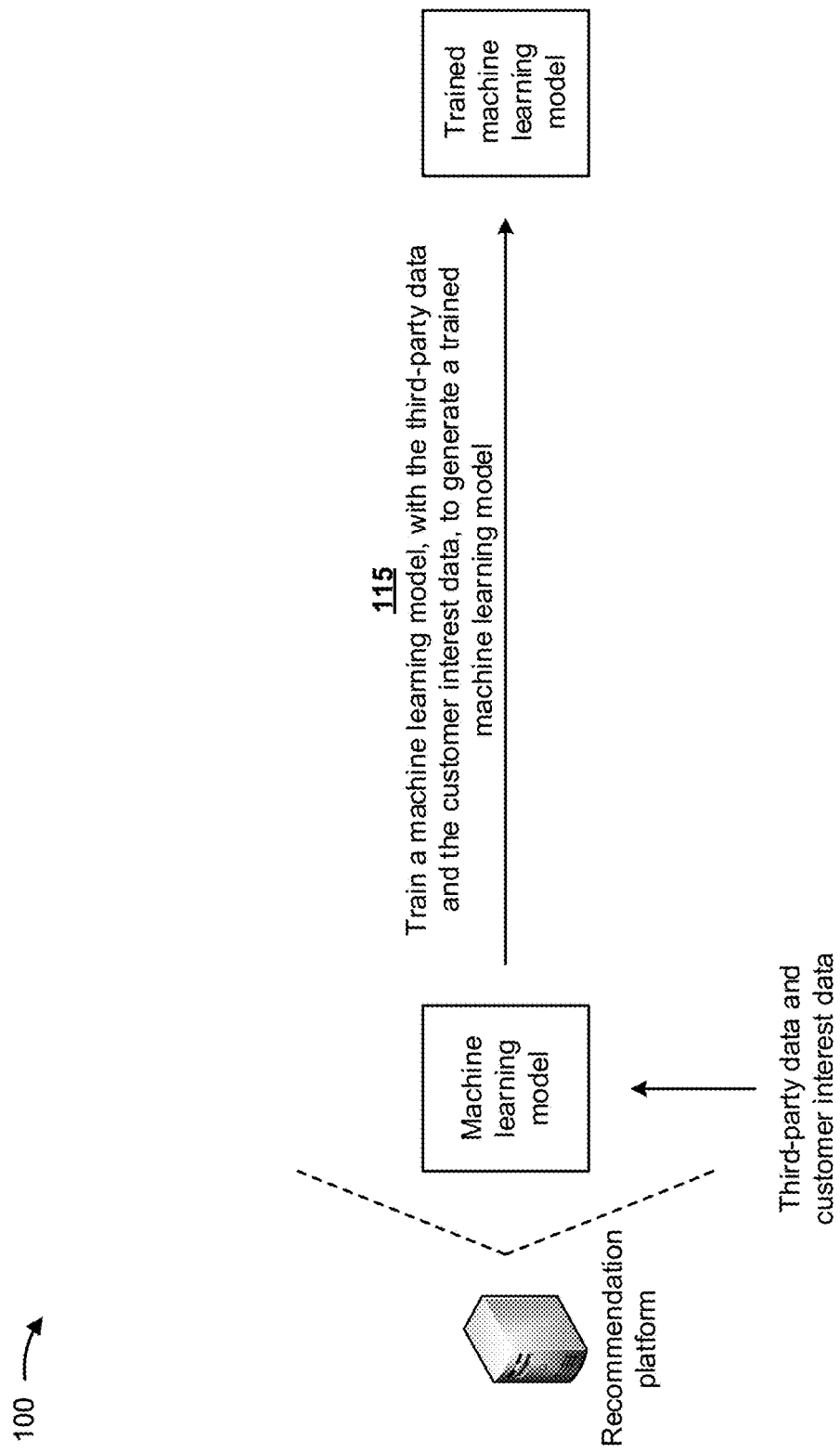

As shown in FIG. 1B, and by reference number 115, the recommendation platform may train a machine learning model, with the third-party data and the customer interest data, to generate a trained machine learning model. In some implementations, the machine learning model may be trained to identify interests of the customers, in products, services, offers, and/or recommendations of the merchants, based on the locations and the birthdates of the customers. In some implementations, the machine learning model may include a neural network classifier model, a long short-term memory (LSTM) model, a reinforcement learning model, and/or the like.

In some implementations, the recommendation platform may train the machine learning model by separating the third-party data and the customer interest data into a training set, a validation set, a test set, and/or the like. The training set may be utilized to train the machine learning model. The validation set may be utilized to validate results of the trained machine learning model. The test set may be utilized to test operation of the machine learning model.

In some implementations, the recommendation platform may train the machine learning model using, for example, an unsupervised training procedure and based on the third-party data and the customer interest data. For example, the recommendation platform may perform dimensionality reduction to reduce the third-party data and the customer interest data to a minimum feature set, thereby reducing resources (e.g., processing resources, memory resources, and/or the like) to train the machine learning model, and may apply a classification technique to the minimum feature set.

In some implementations, the recommendation platform may use a logistic regression classification technique to determine a categorical outcome (e.g., interests of customers in products, services, offers, and/or recommendations of merchants). Additionally, or alternatively, the recommendation platform may use a naïve Bayesian classifier technique. In this case, the recommendation platform may perform binary recursive partitioning to split the third-party data and the customer interest data into partitions and/or branches and use the partitions and/or branches to determine outcomes (e.g., interests of customers in products, services, offers, and/or recommendations of merchants). Based on using recursive partitioning, the recommendation platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the recommendation platform may use a support vector machine (SVM) classifier technique to generate a non-linear boundary between data points in the training set. In this case, the non-linear boundary is used to classify test data into a particular class.

Additionally, or alternatively, the recommendation platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the recommendation platform may use one or more other model training techniques, such as a neural network technique, a latent semantic indexing technique, and/or the like. For example, the recommendation platform may perform an artificial neural network processing technique (e.g., using a two-layer feedforward neural network architecture, a three-layer feedforward neural network architecture, and/or the like) to perform pattern recognition with regard to patterns of the third-party data and the customer interest data. In this case, using the artificial neural network processing technique may improve an accuracy of the trained machine learning model generated by the recommendation platform by being more robust to noisy, imprecise, or incomplete data, and by enabling the recommendation platform to detect patterns and/or trends undetectable to human analysts or systems using less complex techniques.

Figure 1C:
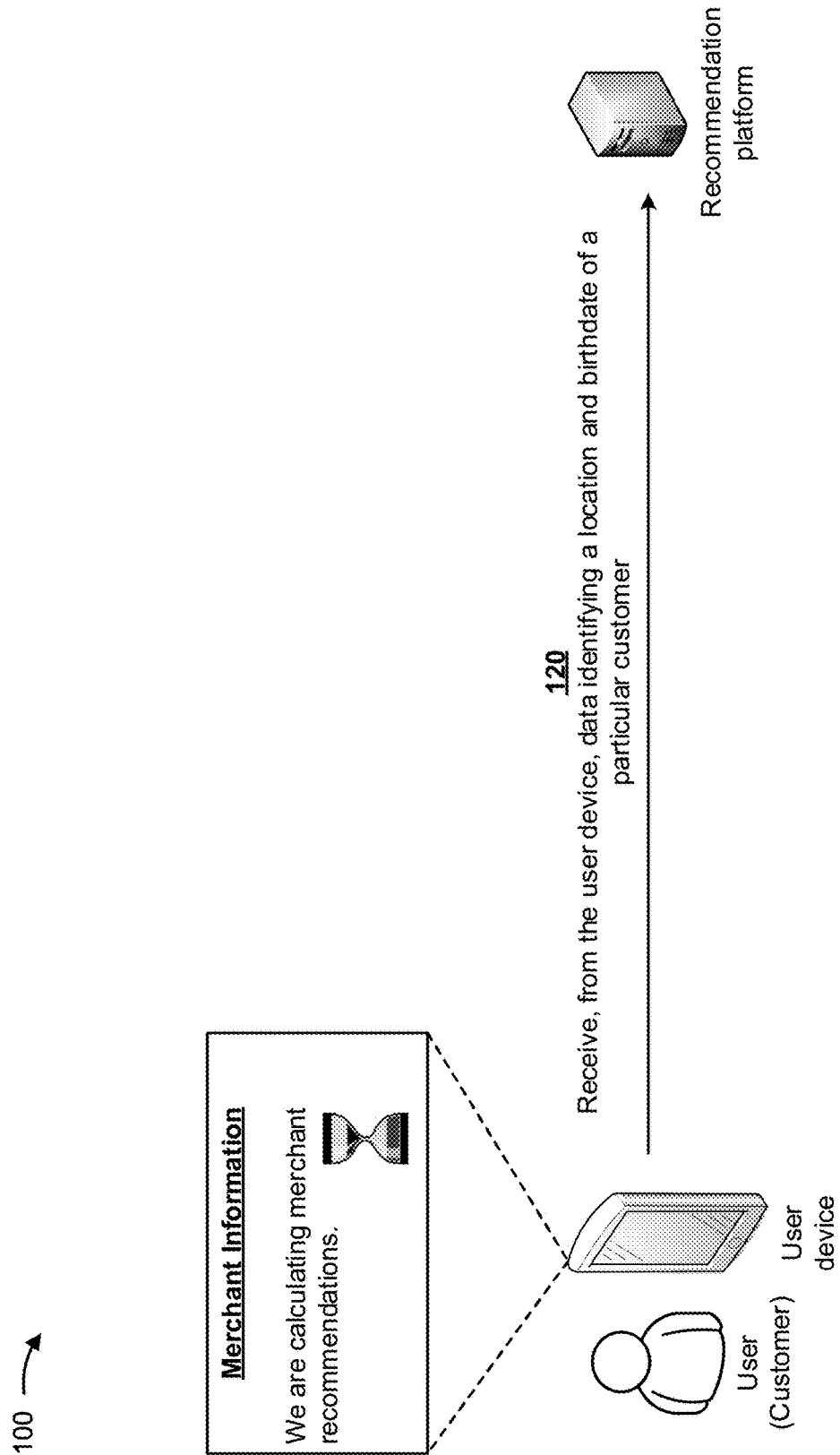

As shown in FIG. 1C, a particular customer may utilize a user device to access information associated with merchants (e.g., provided by websites of the merchants) or a particular merchant (e.g., provided by a website of the particular merchant). As further shown in FIG. 1C, and by reference number 120, the recommendation platform may receive, from the user device, data identifying a location and a birthdate of the particular customer. In some implementations, the location may include a permanent location of the particular customer (e.g., a home address, a work address, and/or the like), a current location of the particular customer, a birthplace location, and/or the like. In some implementations, the recommendation platform may receive the data identifying the location and the birthdate of the particular customer via the customer interest data described above in connection with FIG. 1A and prior to accessing the information associated with the particular merchant. In such implementations, the recommendation platform may identify, in the customer interest data, the data identifying the location and the birthdate of the particular customer when the particular customer accesses the information associated with the particular merchant.

Figure 1D:
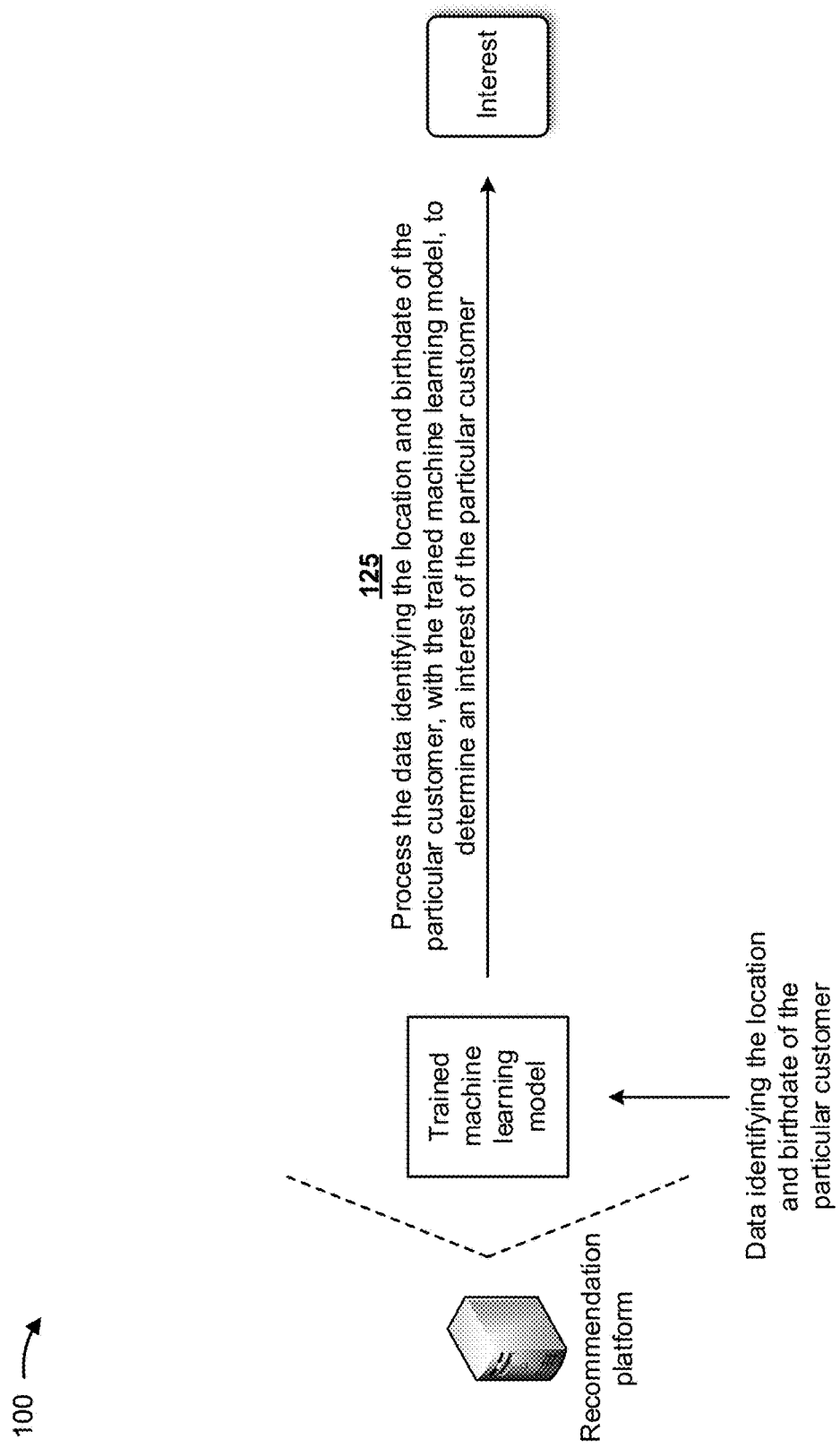

As shown in FIG. 1D, and by reference number 125, the recommendation platform may process the data identifying the location and birthdate of the particular customer, with the trained machine learning model, to determine a predicted interest of the particular customer. In some implementations, the predicted interest of the particular customer may include an interest in one or more products of the merchants or the particular merchant, services of the merchants or the particular merchant, television shows, sports, social causes, types of music, movies, and/or the like.

For example, if the particular customer is a particular age (e.g., twenty-five years old, as determined by the birthdate) and lives in a particular location (e.g., near a beach), the machine learning model may predict that the particular customer has an interest in beach-related activities (e.g., surfing, swimming, beach volleyball, and/or the like). In another example, if the particular customer is a particular age (e.g., forty-four years old, as determined by the birthdate) and lives in a particular location (e.g., in a rural area), the machine learning model may predict that the particular customer has an interest in vehicles used for poor road conditions (e.g., all-terrain vehicles, pickup trucks, and/or the like).

In some implementations, the recommendation platform may determine a profile (e.g., a customer profile, an astrological profile, and/or the like) associated with the particular customer, and may determine the interest of the particular customer that is predicted to match the profile associated with the particular customer. For example, the machine learning model may cluster customers based on birthdates and/or locations, and may identify trends associated with the clusters (e.g., supplemented by pseudoscience data, such as astrological data associated with birthdates and/or birthplace locations) to determine predicted interests of the particular customer. The machine learning model may recommend products and/or services of the merchants that may be of interest to the particular customer based on the profile of the particular customer.

In one example, the recommendation platform may predict a preferred color of vehicle for the particular customer based on the astrological data. The preferred color may not be used to recommend a preferred vehicle type for the particular customer, but may be utilized to supplement the particular customer's preference of a sedan to recommend a particular color of the sedan. The recommendation platform may learn input preferences of the particular customer (e.g., a sedan, an SUV, a truck, a vehicle make, a vehicle model) and may recommend vehicles based on these input preferences. Such recommendations may be triggered by a filter button that causes the recommendation platform to provide an initial suggestion to the particular customer or to refine a search as the particular customer is configuring the input preferences. The recommendation platform may also utilize additional filters to provide additional recommendations (e.g., color of the vehicle) for the recommended vehicles. In some implementations, the recommendation platform may recommend a particular vehicle make and/or model based on the customer profile without the particular customer providing any input preferences.

Figure 1E:
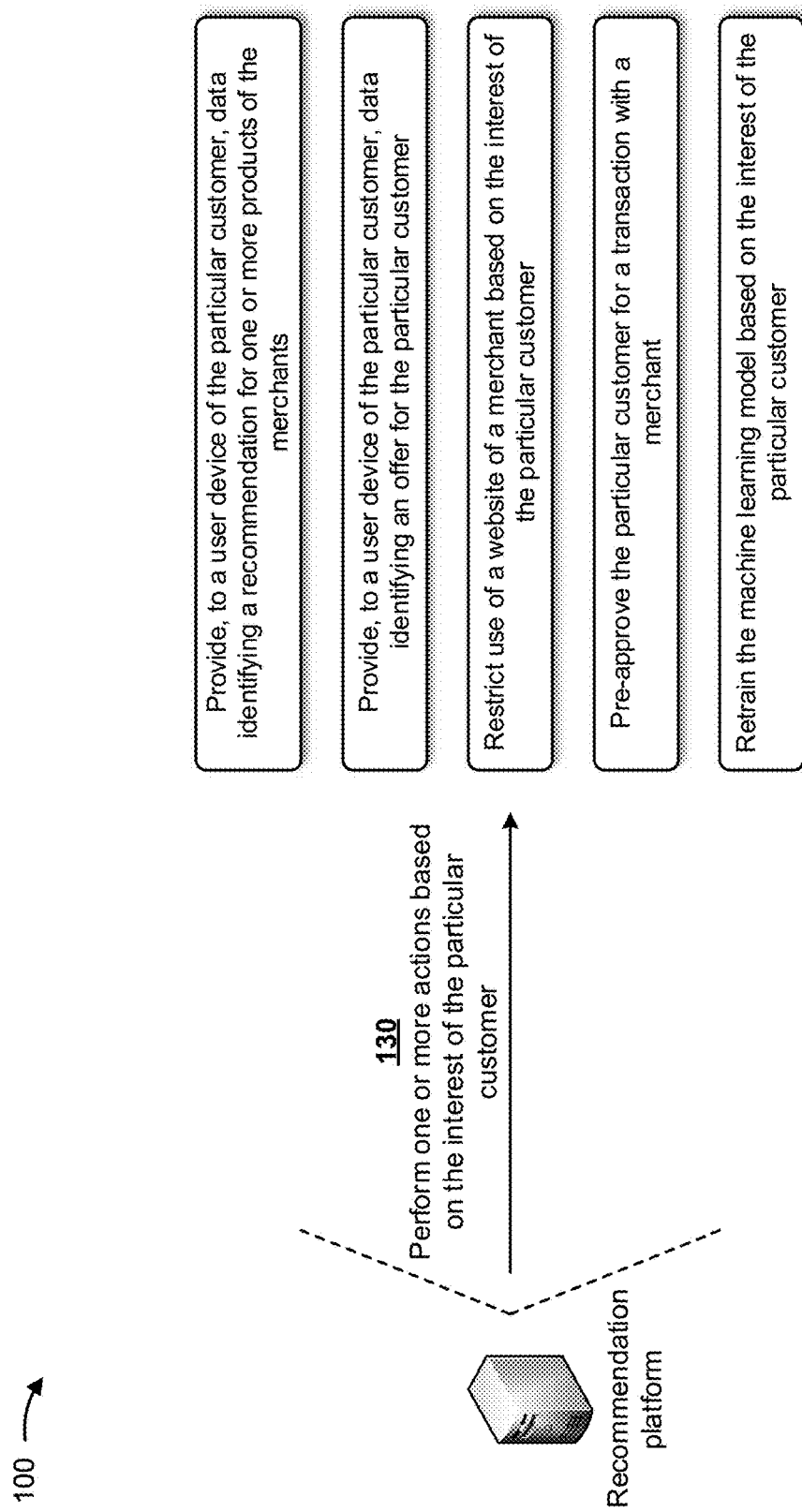

As shown in FIG. 1E, and by reference number 130, the recommendation platform may perform one or more actions based on the predicted interest of the particular customer. In some implementations, the one or more actions may include the recommendation platform providing, to the user device of the particular customer, data identifying a recommendation for one or more products of the merchants (e.g., as triggered by a search filter button). For example, the recommendation platform may recommend a particular product or service of a particular merchant based on the predicted interest of the particular customer. In this way, the recommendation platform may recommend a product or service in which the particular customer is likely to be interested, which may conserve computing resources (e.g., processing resources, memory resources, and/or the like), networking resources, and/or the like that would otherwise be wasted in recommending products and/or services that may not interest the particular customer.

In some implementations, the one or more actions may include the recommendation platform providing, to the user device of the particular customer, data identifying an offer for the particular customer. For example, the recommendation platform may provide an offer for a particular product or service of a particular merchant based on the interest of the particular customer. In this way, the recommendation platform may offer a product or service in which the particular customer is interested, which may conserve computing resources (e.g., processing resources, memory resources, and/or the like), networking resources, and/or the like that would otherwise be wasted in offering products and/or services of no interest to the particular customer.

In some implementations, the one or more actions may include the recommendation platform restricting use of a website of a particular merchant based on the interest of the particular customer. For example, the recommendation platform may prevent the website from displaying products and/or services of the particular merchant that are not related to the interest of the particular customer. In this way, the recommendation platform may present products and/or services in which the particular customer is interested, which may conserve computing resources (e.g., processing resources, memory resources, and/or the like), networking resources, and/or the like that would otherwise be wasted in presenting products and/or services of no interest to the particular customer.

In some implementations, the one or more actions may include the recommendation platform pre-approving the particular customer for a transaction with a particular merchant. In this way, the recommendation platform may automatically inform the particular customer of a preapproved transaction with the particular merchant without requiring the customer to consume computing resources (e.g., processing resources, memory resources, and/or the like), networking resources, and/or the like in attempting to receive approval for the transaction.

In some implementations, the one or more actions may include the recommendation platform retraining the machine learning model based on a determined interest of the particular customer. For example, the determined interest may include an actual interest of the particular customer in a product and/or a service that particular customer actually purchased, provided feedback about, and/or the like. In this way, the machine learning model may more accurately determine interests of customers based on locations and birthdates of the customers.

In some implementations, the one or more actions may include the recommendation platform providing, to a server device associated with a particular merchant, information identifying a product and/or a service provided by the merchant and related to the interest of a particular customer. In this way, the particular merchant may cease providing products and/or services in which customers are not interested and may conserve resources that would otherwise be wasted in offering such products and/or services and/or help customers identify products of potential interest faster or more efficiently.

Figure 1F:
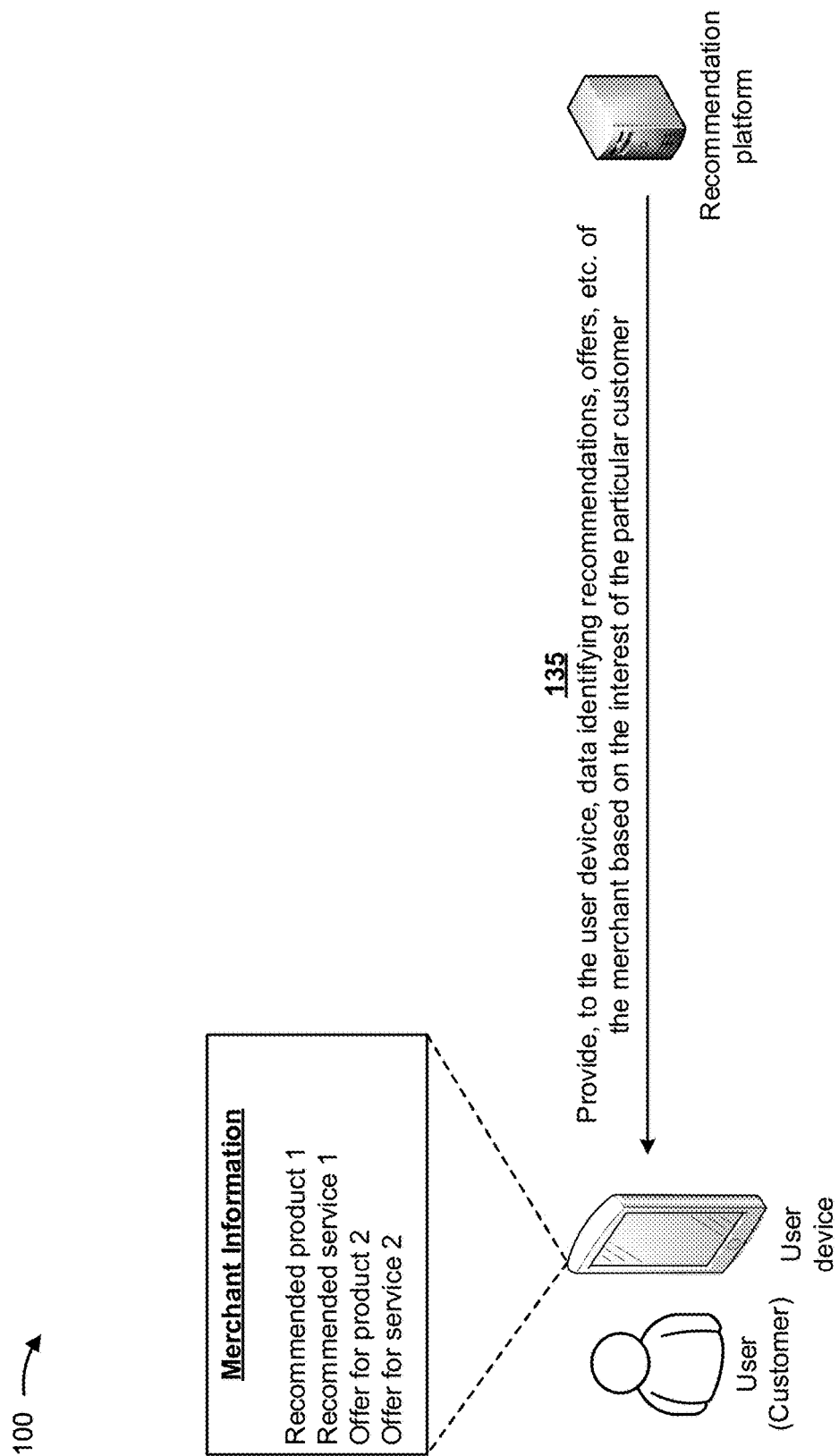

As shown in FIG. 1F, and by reference number 135, the recommendation platform may provide, to the user device of the particular customer, data identifying recommendations, offers, and/or the like of the particular merchant, based on the interest of the particular customer. The user device may receive the data identifying recommendations, offers, and/or the like of the particular merchant and may provide the data identifying recommendations, offers, and/or the like of the particular merchant for display to the particular customer via a user interface. For example, the user interface may include data recommending a first product (e.g., product 1) and a first service (e.g., service 1), data identifying offers for a second product (e.g., product 2) and a second service (e.g., service 2), and/or the like.

Figure 1G:
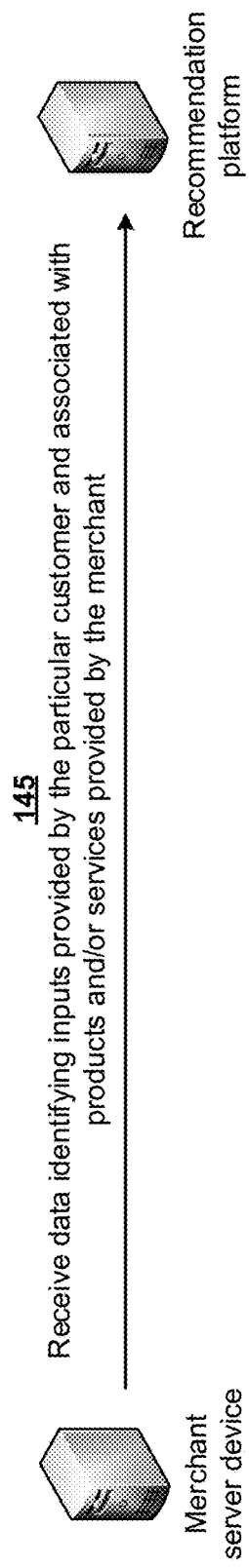

As shown in FIG. 1G, and by reference number 145, the recommendation platform may receive, from a merchant server device associated with the particular merchant, data identifying inputs provided by the particular customer and associated with products and/or services provided by the particular merchant. In some implementations, the data identifying inputs may include website activity data identifying one or more inputs by the particular customer to a website of the particular merchant (e.g., that includes data identifying the products and/or services provided by the particular merchant). In some implementations, the data identifying the inputs may include data identifying social media data associated with the particular customer and the products and/or services provided by the particular merchant, transaction data associated with a transaction between the particular customer and the particular merchant, and/or the like.

Figure 1H:
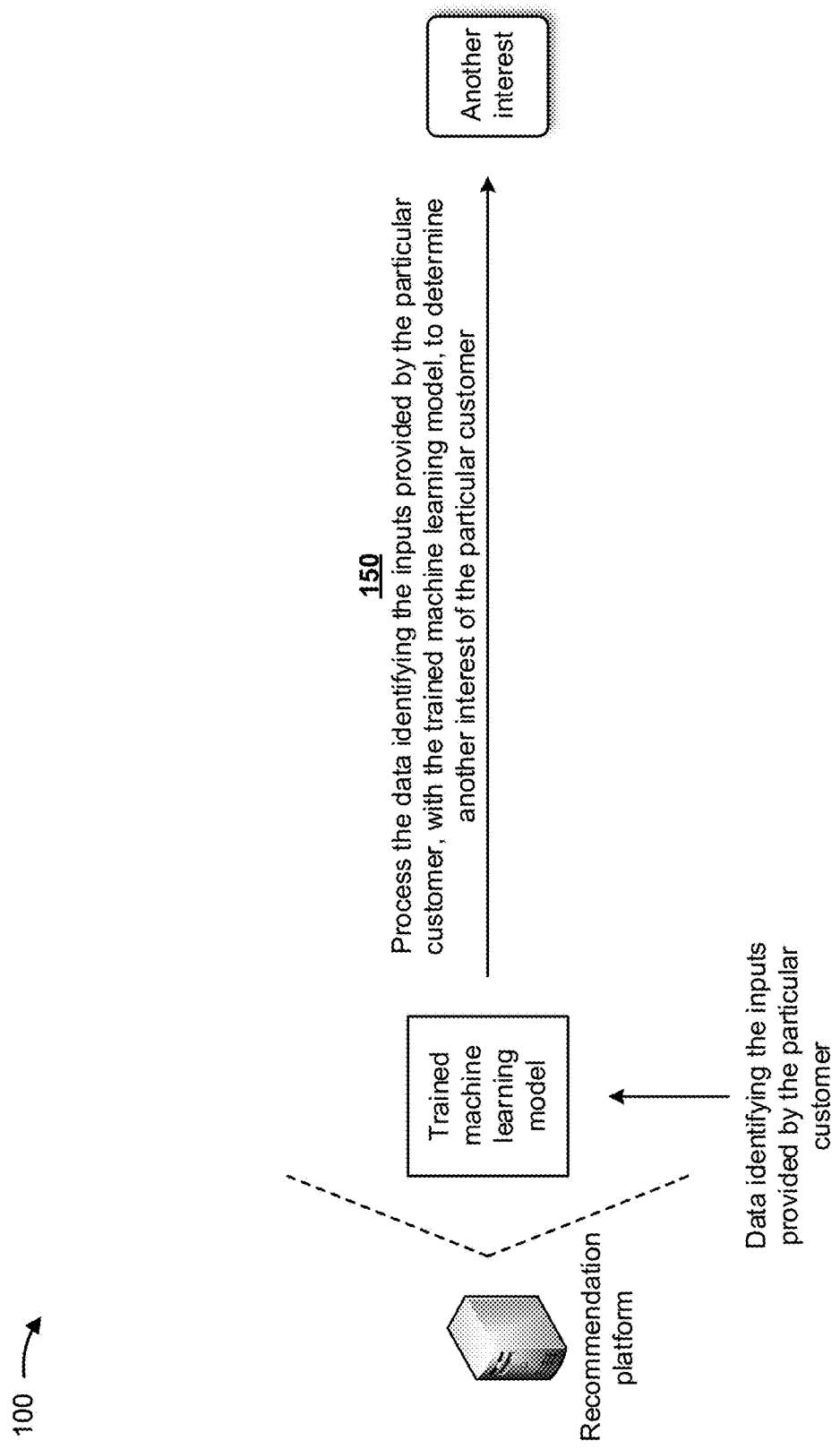

As shown in FIG. 1H, and by reference number 150, the recommendation platform may process the data identifying the inputs provided by the particular customer, with the trained machine learning model, to determine another interest of the particular customer. For example, the recommendation platform may recommend another particular product or service of the particular merchant based on the other interest of the particular customer. In some implementations, the recommendation platform may perform the one or more actions, described above in connection with FIG. 1E, based on the other interest of the particular customer. In some implementations, the recommendation platform may determine a modification to the interest of the particular customer based on the data identifying the inputs provided by the particular customer, and may perform the one or more actions, described above in connection with FIG. 1E, based on the modification to the interest of the particular customer.

In some implementations, the recommendation platform may provide, to the user device of the particular customer, data identifying a recommendation for the particular customer and associated with the particular merchant, and may receive, from the user device, data indicating an interaction with the recommendation. The recommendation platform may update the recommendation, to generate an updated recommendation, based on the data indicating the interaction with the recommendation, and may provide, to the user device, data identifying the updated recommendation.

In some implementations, the recommendation platform may provide, to the user device, data identifying an offer for the particular customer and associated with the particular merchant, and may receive, from the user device, data indicating an interaction with the offer. The recommendation platform may update the offer, to generate an updated offer, based on the data indicating the interaction with the offer, and may provide, to the user device, data identifying the updated offer.

In this way, the recommendation platform may continuously improve recommendations for products and/or services in which the particular customer demonstrates interest, which may conserve computing resources (e.g., processing resources, memory resources, and/or the like), networking resources, and/or the like that would otherwise be wasted in recommending products and/or services of little or no interest to the particular customer.

Figure 1I:
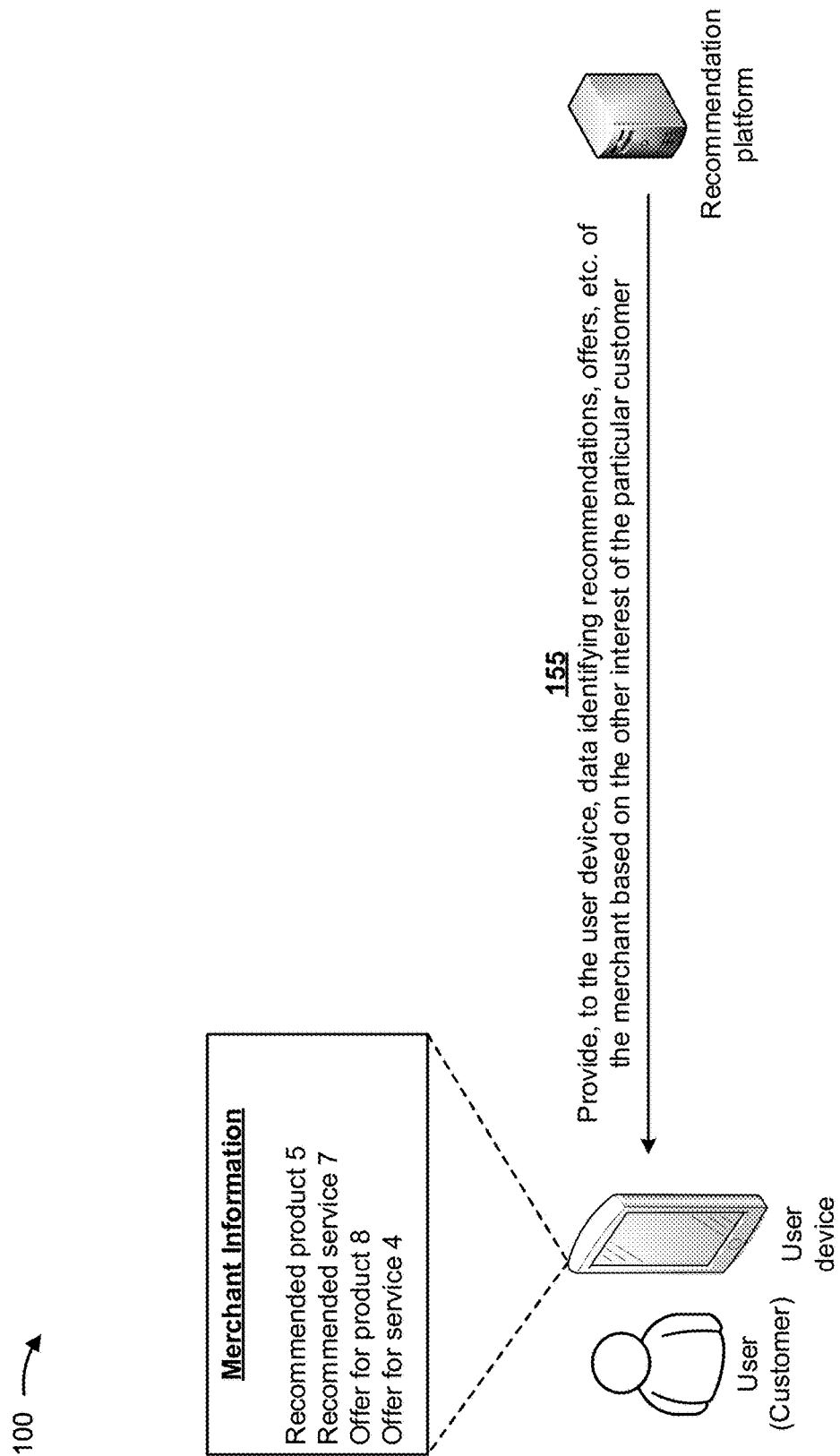

As shown in FIG. 1I, and by reference number 155, the recommendation platform may provide, to the user device of the particular customer, data identifying recommendations, offers, and/or the like of the particular merchant, based on the other interest of the particular customer. The user device may receive the data identifying recommendations, offers, and/or the like of the particular merchant and may provide the data identifying recommendations, offers, and/or the like of the particular merchant for display to the particular customer via a user interface. For example, the user interface may include data recommending a fifth product (e.g., product 5) and a seventh service (e.g., service 7), data identifying offers for an eighth product (e.g., product 8) and a fourth service (e.g., service 4), and/or the like.

In this way, several different stages of the process for determining interests and recommendations for a customer of a merchant may be automated with machine learning, which may improve speed and efficiency of the process and conserve computing resources (e.g., processing resources, memory resources, and/or the like). Furthermore, implementations described herein use a rigorous, computerized process to perform tasks or roles that were not previously performed. For example, currently there does not exist a technique that utilizes a machine learning model to determine interests and recommendations for a customer of a merchant. Further, the process for determining interests and recommendations for a customer of a merchant conserves resources (e.g., processing resources, memory resources, network resources, manufacturing resources, transportation resources, and/or the like) that would otherwise be wasted producing and promoting products and/or services of no interest to customers, reviewing offers for products and/or services of no interest to the customers, and/or the like.

As indicated above, FIGS. 1A-1I are provided merely as examples. Other examples may differ from what is described with regard to FIGS. 1A-1I.

Figure 2:
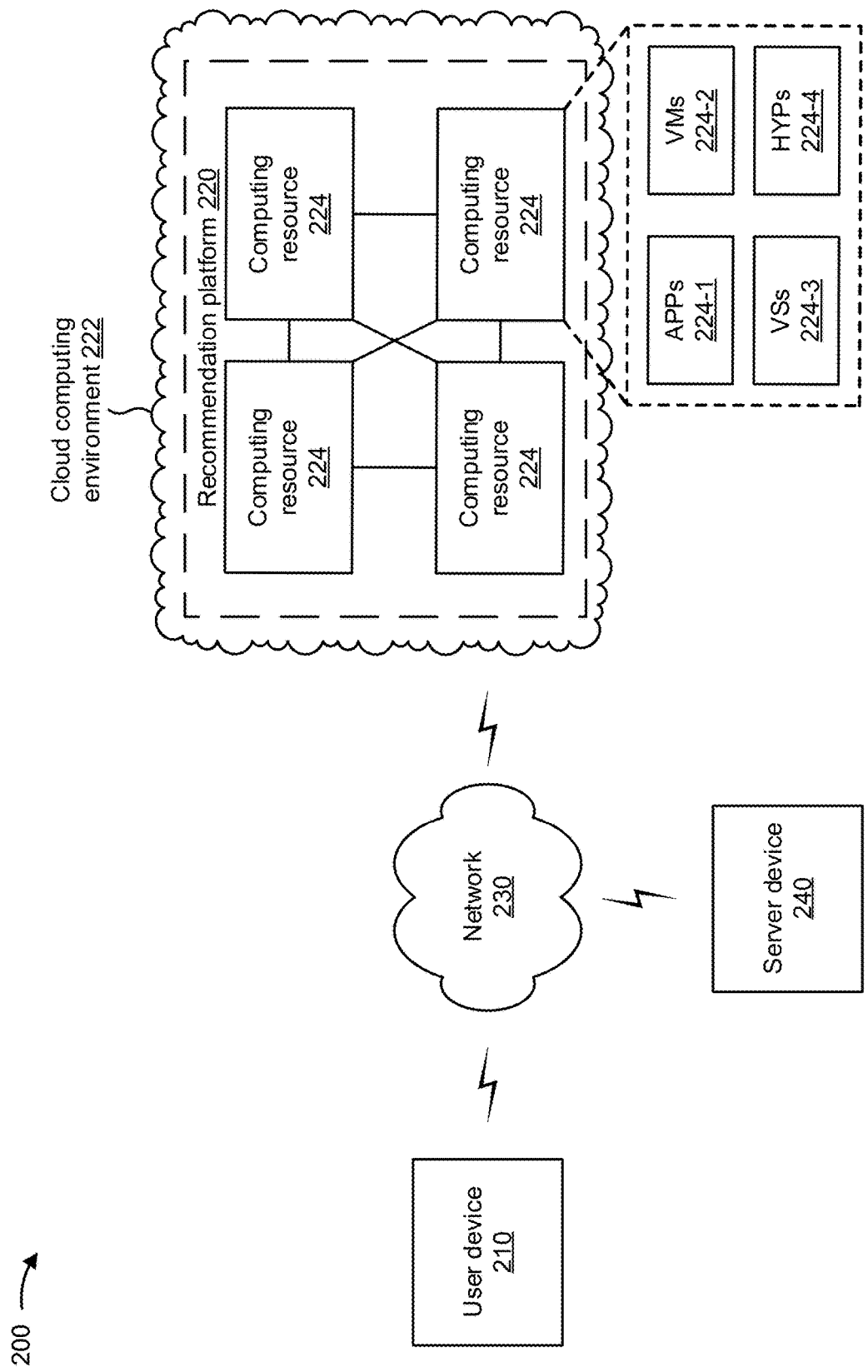
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a recommendation platform 220, a network 230, and a server device 240. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to recommendation platform 220 and/or server device 240.

Recommendation platform 220 includes one or more devices that may utilize a machine learning model to determine interests and recommendations for a customer of a merchant. In some implementations, recommendation platform 220 may be modular such that certain software components may be swapped in or out depending on a particular need. As such, recommendation platform 220 may be easily and/or quickly reconfigured for different uses. In some implementations, recommendation platform 220 may receive information from and/or transmit information to one or more user devices 210 and/or server devices 240.

In some implementations, as shown, recommendation platform 220 may be hosted in a cloud computing environment 222. Notably, while implementations described herein describe recommendation platform 220 as being hosted in cloud computing environment 222, in some implementations, recommendation platform 220 may be non-cloud-based (i.e., may be implemented outside of a cloud computing environment) or may be partially cloud-based.

Cloud computing environment 222 includes an environment that may host recommendation platform 220. Cloud computing environment 222 may provide computation, software, data access, storage, etc. services that do not require end-user knowledge of a physical location and configuration of system(s) and/or device(s) that host recommendation platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host recommendation platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with recommendation platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 or an operator of recommendation platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may provide administrators of the storage system with flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with a merchant, a financial institution, a social media service, and/or the like. In some implementations, server device 240 may receive information from and/or transmit information to user device 210 and/or recommendation platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device and/or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
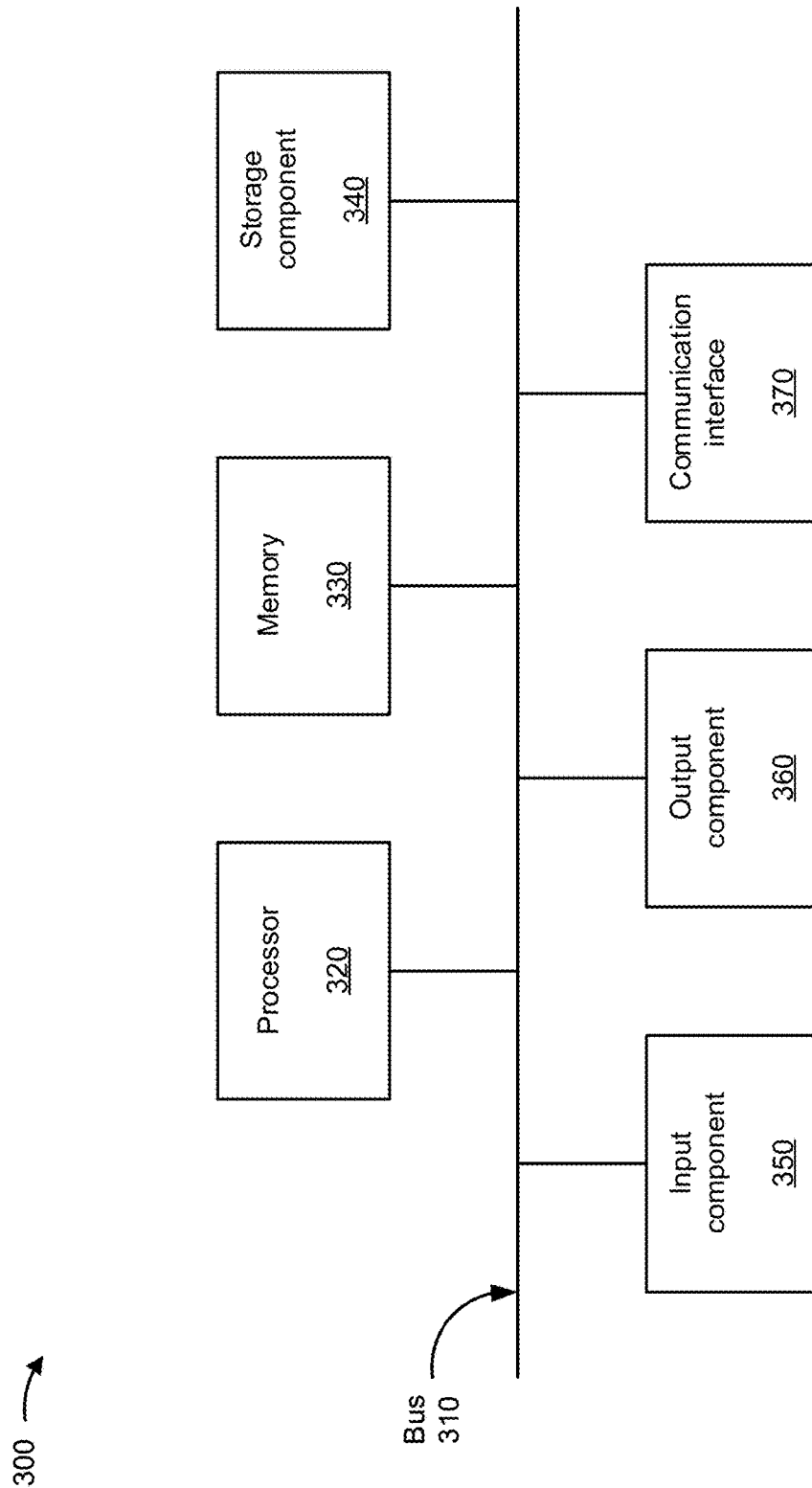
FIG. 3 is a diagram of example components of one or more devices of FIG. 2.

FIG. 3 is a diagram of example components of a device 300. Device 300 may correspond to user device 210, recommendation platform 220, computing resource 224, and/or server device 240. In some implementations, user device 210, recommendation platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
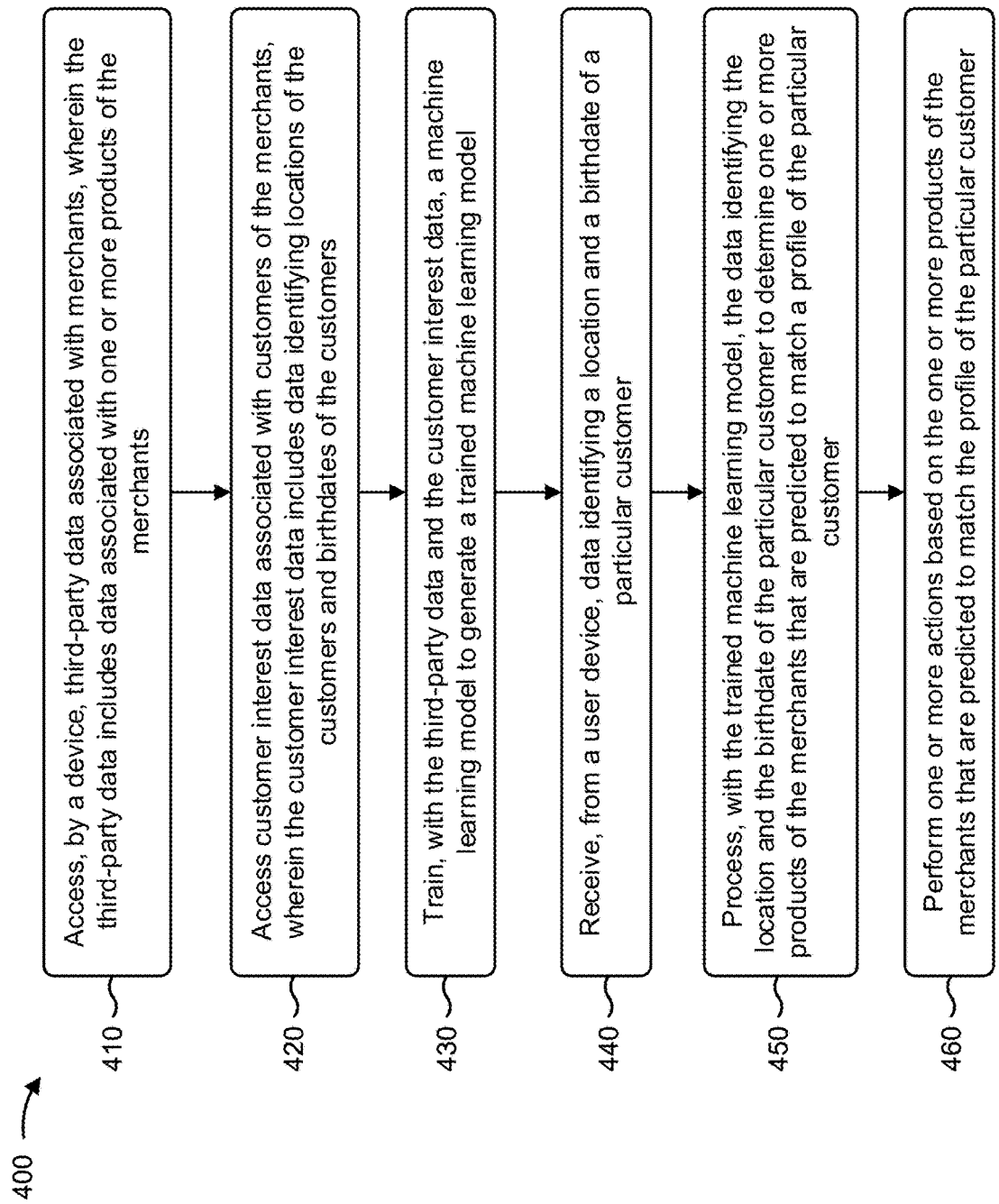
FIGS. 4-6 are flow charts of example processes for utilizing a machine learning model to determine interests and recommendations for a customer of a merchant.

FIG. 4 is a flow chart of an example process 400 for utilizing a machine learning model to determine interests and recommendations for a customer of a merchant. In some implementations, one or more process blocks of FIG. 4 may be performed by a recommendation platform (e.g., recommendation platform 220). In some implementations, one or more process blocks of FIG. 4 may be performed by another device or a group of devices separate from or including the recommendation platform, such as a user device (e.g., user device 210) and/or a server device (e.g., server device 240).

As shown in FIG. 4, process 400 may include accessing third-party data associated with merchants, wherein the third-party data includes data associated with one or more products of the merchants (block 410). For example, the recommendation platform (e.g., using computing resource 224, processor 320, communication interface 370, and/or the like) may access third-party data associated with merchants, as described above. In some implementations, the third-party data may include data associated with one or more products of the merchants.

As further shown in FIG. 4, process 400 may include accessing customer interest data associated with customers of the merchants wherein the customer interest data includes data identifying locations of the customers and birthdates of the customers (block 420). For example, the recommendation platform (e.g., using computing resource 224, processor 320, communication interface 370, and/or the like) may receive customer interest data associated with customers of the merchants, as described above. In some implementations, the customer interest data may include data identifying locations of the customers and birthdates of the customers.

As further shown in FIG. 4, process 400 may include training, with the third-party data and the customer interest data, a machine learning model to generate a trained machine learning model (block 430). For example, the recommendation platform (e.g., using computing resource 224, processor 320, memory 330, and/or the like) may train, with the third-party data and the customer interest data, a machine learning model to generate a trained machine learning model, as described above.

As further shown in FIG. 4, process 400 may include receiving, from a user device, data identifying a location and a birthdate of a particular customer (block 440). For example, the recommendation platform (e.g., using computing resource 224, processor 320, storage component 340, and/or the like) may receive, from a user device, data identifying a location and a birthdate of a particular customer.

As further shown in FIG. 4, process 400 may include processing, with the trained machine learning model, the data identifying the location and the birthdate of the particular customer to determine an interest of the particular customer (block 450). For example, the recommendation platform (e.g., using computing resource 224, processor 320, memory 330, and/or the like) may process, with the trained machine learning model, the data identifying the location and the birthdate of the particular customer to determine an interest of the particular customer, as described above.

As further shown in FIG. 4, process 400 may include performing one or more actions based on the one or more products of the merchants that are predicted to match the profile of the particular customer (block 460). For example, the recommendation platform (e.g., using computing resource 224, processor 320, memory 330, communication interface 370, and/or the like) may perform one or more actions based on the one or more products of the merchants that are predicted to match the profile of the particular customer, as described above.

Process 400 may include additional implementations, such as any single implementation or any combination of implementations described below and/or in connection with one or more other processes described elsewhere herein.

In some implementations, when performing the one or more actions, the recommendation platform may providing, to the user device, data identifying a recommendation for the one or more products of the merchants; may provide, to the user device, data identifying an offer for the particular customer and associated with a particular merchant of the merchants; may restrict use, by the user device, of a website associated with the particular merchant; may pre-approve the particular customer for a transaction with the particular merchant; or may retrain the machine learning model based on the interest of the particular customer.

In some implementations, the recommendation platform may receive data identifying an input provided by the particular customer via the user device, where the input may be associated with the particular merchant, may process the data identifying the input provided by the particular customer, with the trained machine learning model, to determine another interest of the particular customer, and may perform one or more additional actions based on the other interest of the particular customer.

In some implementations, when performing the one or more additional actions, the recommendation platform may provide, to the user device, data identifying a recommendation for the particular customer and associated with the particular merchant; may provide, to the user device, data identifying an offer for the particular customer and associated with the particular merchant; may restrict use, by the user device, of a website associated with the particular merchant; may pre-approve the particular customer for a transaction with the particular merchant; or may retrain the machine learning model based on the other interest of the particular customer.

In some implementations, the customer interest data may further include one or more of: social media data associated with the customers, transaction data associated with the customers, or website activity data associated with the customers.

In some implementations, the recommendation platform may receive transaction data associated with a transaction between the particular customer and the particular merchant, may process the transaction data, with the trained machine learning model, to determine another interest of the particular customer, and may perform one or more additional actions based on the other interest of the particular customer.

In some implementations, the transaction data may relate to one or more of: a particular product offered by the particular merchant, or a particular service offered by the particular merchant.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
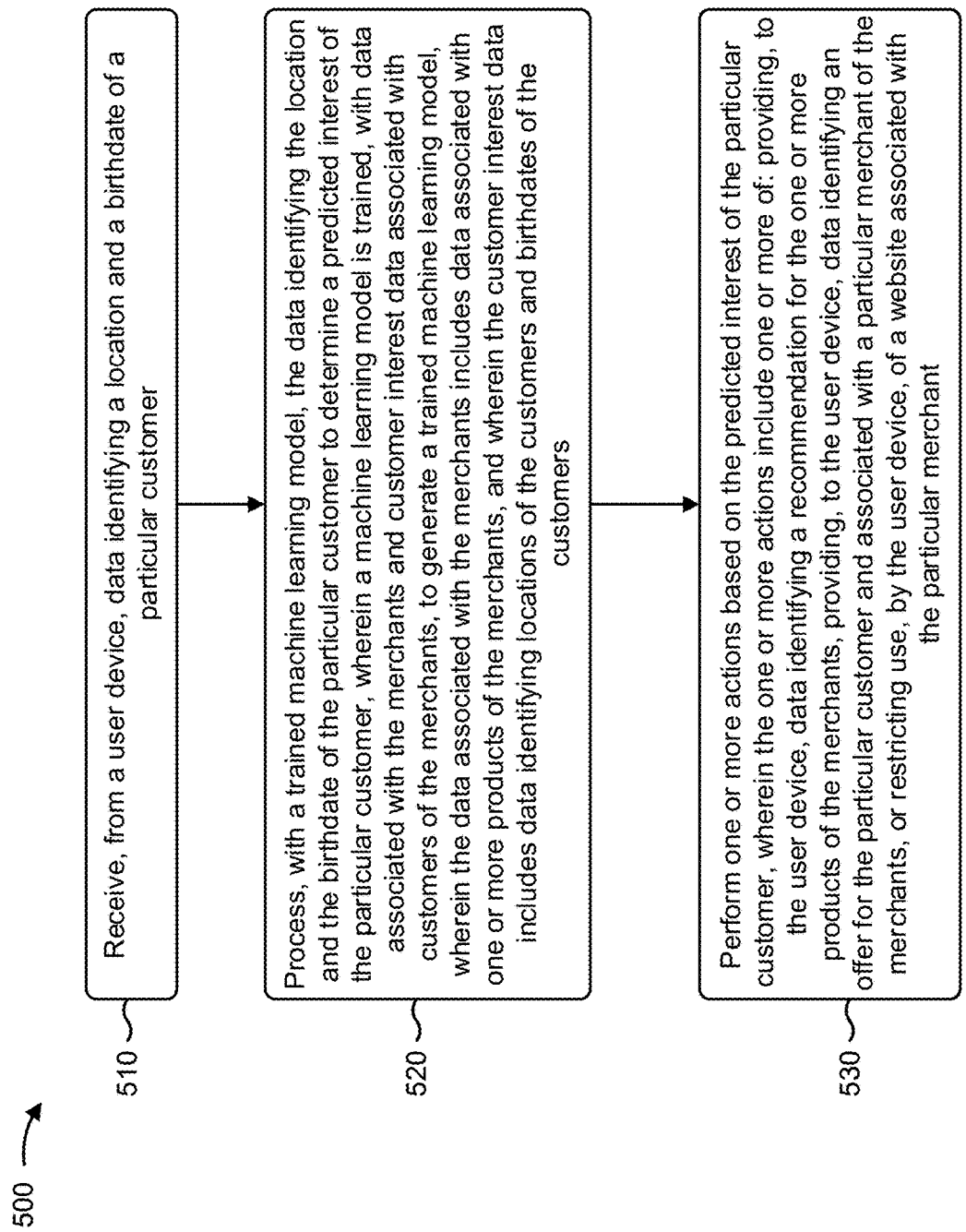

FIG. 5 is a flow chart of an example process 500 for utilizing a machine learning model to determine interests and recommendations for a customer of a merchant. In some implementations, one or more process blocks of FIG. 5 may be performed by a recommendation platform (e.g., recommendation platform 220). In some implementations, one or more process blocks of FIG. 5 may be performed by another device or a group of devices separate from or including the recommendation platform, such as a user device (e.g., user device 210) and/or a server device (e.g., server device 240).

As shown in FIG. 5, process 500 may include receiving, from a user device, data identifying a location and a birthdate of a particular customer (block 510). For example, the recommendation platform (e.g., using computing resource 224, processor 320, communication interface 370, and/or the like) may receive, from a user device, data identifying a location and a birthdate of a particular customer, as described above.

As further shown in FIG. 5, process 500 may include processing, with a trained machine learning model, the data identifying the location and the birthdate of the particular customer to determine an interest of the particular customer, wherein a machine learning model is trained, with data associated with the merchants and customer interest data associated with customers of the merchants, to generate a trained machine learning model, wherein the data associated with the merchants includes data associated with one or more products of the merchants, and wherein the customer interest data includes data identifying locations of the customers and birthdates of the customers (block 520). For example, the recommendation platform (e.g., using computing resource 224, processor 320, memory 330, and/or the like) may process, with a trained machine learning model, the data identifying the location and the birthdate of the particular customer to determine one or more products of merchants that are predicted to match a profile of the particular customer, as described above. In some implementations, a machine learning model may be trained, with data associated with the merchants and customer interest data associated with customers of the merchants, to generate a trained machine learning model. In some implementations, the data associated with the merchants may include data associated with one or more products of the merchants, and the customer interest data may include data identifying locations of the customers and birthdates of the customers.

As further shown in FIG. 5, process 500 may include performing one or more actions based on the interest of the particular customer, wherein the one or more actions include one or more of providing, to the user device, data identifying a recommendation for one or more products of the merchants, providing, to the user device, data identifying an offer for the particular customer and associated with a particular merchant of the merchants, restricting use, by the user device, of a website associated with the particular merchant, pre-approving the particular customer for a transaction with the particular merchant, or retraining the machine learning model based on the interest of the particular customer (block 530). For example, the recommendation platform (e.g., using computing resource 224, processor 320, memory 330, storage component 340, communication interface 370, and/or the like) may perform one or more actions based on the interest of the particular customer, as described above. In some implementations, when performing the one or more actions, the recommendation platform may provide, to the user device, data identifying a recommendation for one or more products of the merchants, provide, to the user device, data identifying an offer for the particular customer and associated with a particular merchant of the merchants, restrict use, by the user device, of a website associated with the particular merchant, pre-approve the particular customer for a transaction with the particular merchant, or retrain the machine learning model based on the interest of the particular customer.

Process 500 may include additional implementations, such as any single implementation or any combination of implementations described below and/or in connection with one or more other processes described elsewhere herein.

In some implementations, the recommendation platform may receive social media data associated with the particular customer, may process the social media data, with the trained machine learning model, to determine another interest of the particular customer, and may perform one or more additional actions based on the other interest of the particular customer.

In some implementations, the recommendation platform may receive website activity data associated with the particular customer, may process the website activity data, with the trained machine learning model, to determine another interest of the particular customer, and may perform one or more additional actions based on the other interest of the particular customer.

In some implementations, the recommendation platform may receive one or more of transaction data associated with a transaction between the particular customer and the particular merchant, social media data associated with the particular customer, or website activity data associated with the particular customer; may process the one or more of the transaction data, the social media data, or the website activity data, with the trained machine learning model, to determine a modification to the interest of the particular customer; and may perform one or more additional actions based on the modification to the interest of the particular customer.

In some implementations, the machine learning model may include one or more of: a neural network classifier model, a long short-term memory (LSTM) model, or a reinforcement learning model.

In some implementations, when performing the one or more actions, the recommendation platform may provide, to the user device, data identifying a recommendation for the particular customer and associated with the particular merchant, and the recommendation platform may receive, from the user device, data indicating an interaction with the recommendation, may update the recommendation, to generate an updated recommendation, based on the data indicating the interaction with the recommendation, and may provide, to the user device, data identifying the updated recommendation.

In some implementations, when performing the one or more actions, the recommendation platform may provide, to the user device, data identifying an offer for the particular customer and associated with the particular merchant, and the recommendation platform may receive, from the user device, data indicating an interaction with the offer, may update the offer, to generate an updated offer, based on the data indicating the interaction with the offer, and may provide, to the user device, data identifying the updated offer.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
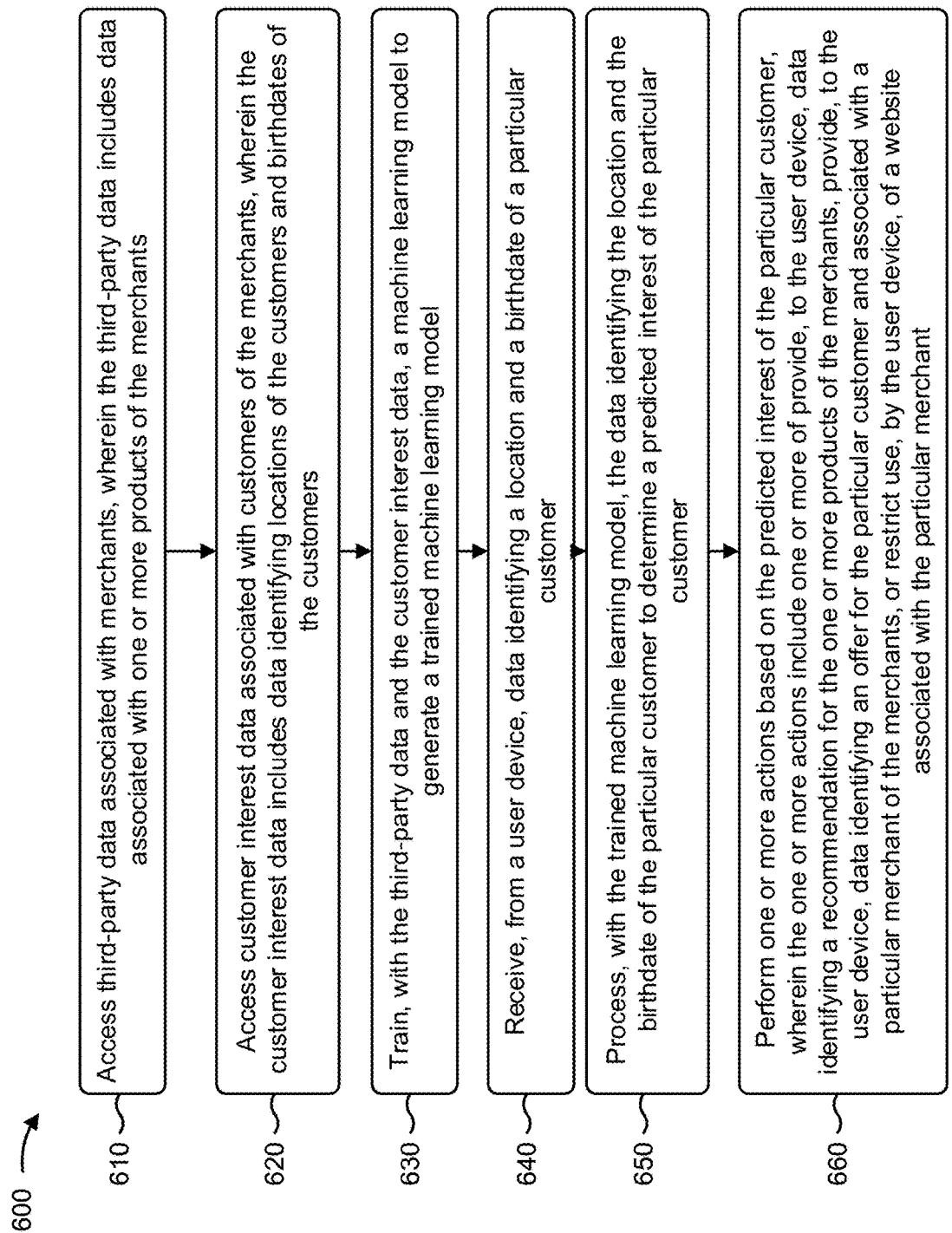

FIG. 6 is a flow chart of an example process 600 for utilizing a machine learning model to determine interests and recommendations for a customer of a merchant. In some implementations, one or more process blocks of FIG. 6 may be performed by a recommendation platform (e.g., recommendation platform 220). In some implementations, one or more process blocks of FIG. 6 may be performed by another device or a group of devices separate from or including the recommendation platform, such as a user device (e.g., user device 210) and/or a server device (e.g., server device 240).

As shown in FIG. 6, process 600 may include accessing third-party data associated with merchants, wherein the third-party data includes data associated with one or more products of the merchants (block 610). For example, the recommendation platform (e.g., using computing resource 224, processor 320, communication interface 370, and/or the like) may access third-party data associated with merchants, as described above. In some implementations, the third-party data may include data associated with one or more products of the merchants.

As further shown in FIG. 6, process 600 may include accessing customer interest data associated with customers of the merchants, wherein the customer interest data includes data identifying locations of the customers and birthdates of the customers (block 620). For example, the recommendation platform (e.g., using computing resource 224, processor 320, communication interface 370, and/or the like) may access customer interest data associated with customers of the merchants, as described above. In some implementations, the customer interest data may include data identifying locations of the customers and birthdates of the customers.

As further shown in FIG. 6, process 600 may include training, with the third-party data and the customer interest data, a machine learning model to generate a trained machine learning model (block 630). For example, the recommendation platform (e.g., using computing resource 224, processor 320, memory 330, and/or the like) may train, with the third-party data and the customer interest data, a machine learning model to generate a trained machine learning model, as described above.

As further shown in FIG. 6, process 600 may include receiving, from a user device, data identifying a location and a birthdate of a particular customer (block 640). For example, the recommendation platform (e.g., using computing resource 224, processor 320, communication interface 370, and/or the like) may receive, from a user device, data identifying a location and a birthdate of a particular customer.

As further shown in FIG. 6, process 600 may include processing, with the trained machine learning model, the data identifying the location and the birthdate of the particular customer to determine an interest of the particular customer (block 650). For example, the recommendation platform (e.g., using computing resource 224, processor 320, storage component 340, and/or the like) may process, with the trained machine learning model, the data identifying the location and the birthdate of the particular customer to determine an interest of the particular customer, as described above.

As further shown in FIG. 6, process 600 may include performing one or more actions based on the interest of the particular customer, wherein performing the one or more actions includes one or more of providing, to the user device, data identifying a recommendation for the one or more products of the merchants, providing, to the user device, data identifying an offer for the particular customer and associated with a particular merchant of the merchants, restricting use, by the user device, of a website associated with the particular merchant, or preapproving the particular customer for a transaction with the particular merchant (block 660). For example, the recommendation platform (e.g., using computing resource 224, processor 320, memory 330, storage component 340, communication interface 370, and/or the like) may perform one or more actions based on the interest of the particular customer, as described above. In some implementations, when performing the one or more actions, the recommendation platform may provide, to the user device, data identifying a recommendation for the one or more products of the merchants, provide, to the user device, data identifying an offer for the particular customer and associated with a particular merchant of the merchants, restrict use, by the user device, of a website associated with the particular merchant, or preapprove the particular customer for a transaction with the particular merchant.

Process 600 may include additional implementations, such as any single implementation or any combination of implementations described below and/or in connection with one or more other processes described elsewhere herein.

In some implementations, the recommendation platform may receive data identifying an input provided by the particular customer via the user device, wherein the input may be associated with the particular merchant; may process the data identifying the input provided by the particular customer, with the trained machine learning model, to determine another interest of the particular customer; and may perform one or more additional actions based on the other interest of the particular customer.

In some implementations, the customer interest data may further include one or more of social media data associated with the customers, transaction data associated with the customers, or website activity data associated with the customers.

In some implementations, the recommendation platform may receive transaction data associated with a transaction between the particular customer and the particular merchant; may process the transaction data, with the trained machine learning model, to determine another interest of the particular customer; and may perform one or more additional actions based on the other interest of the particular customer.

In some implementations, the recommendation platform may receive social media data associated with the particular customer; may process the social media data, with the trained machine learning model, to determine another interest of the particular customer; and may perform one or more additional actions based on the other interest of the particular customer.

In some implementations, the recommendation platform may receive website activity data associated with the particular customer; may process the website activity data, with the trained machine learning model, to determine another interest of the particular customer; and may perform one or more additional actions based on the other interest of the particular customer.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   accessing, by a device, third-party data associated with merchants,
      wherein the third-party data includes data associated with one or more products of the merchants;
   accessing, by the device, customer interest data associated with customers of the merchants,
      wherein the customer interest data includes first data identifying:
         locations of the customers, and
         birthdates of the customers;
   training, by the device and with the third-party data and the customer interest data, a machine learning model, to generate a trained machine learning model,
      the trained machine learning model to identify trends associated with a cluster of customers based on the locations of the customers, the birthdates of the customers, and astrological data associated with the birthdates;
   receiving, by the device and from a user device, second data identifying a location and a birthdate of a particular customer;
   processing, by the device and with the trained machine learning model, the second data identifying the location and the birthdate of the particular customer to determine one or more products of the merchants that are predicted to match a profile of the particular customer; and
   performing, by the device, one or more actions based on the one or more products of the merchants that are predicted to match the profile of the particular customer,
      the one or more actions including one or more of:
         restricting use, by the user device, of a website associated with a particular merchant of the merchants;
         or
         retraining the machine learning model based on an interest of the particular customer.

2. The method of claim 1, further comprising:
receiving third data identifying an input provided by the particular customer via the user device,
wherein the input is associated with the particular merchant;
processing the third data identifying the input provided by the particular customer, with the trained machine learning model, to determine another interest of the particular customer; and
performing one or more additional actions based on the other interest of the particular customer.

3. The method of claim 2, wherein performing the one or more additional actions comprises one or more of:
providing, to the user device, fourth data identifying a recommendation for the particular customer and associated with the particular merchant;
providing, to the user device, fifth data identifying an offer for the particular customer and associated with the particular merchant;
restricting use, by the user device, of a website associated with the particular merchant;
pre-approving the particular customer for a transaction with the particular merchant; or
retraining the machine learning model based on the other interest of the particular customer.

4. The method of claim 1, wherein the customer interest data further includes one or more of:
social media data associated with the customers,
transaction data associated with the customers, or
website activity data associated with the customers.

5. The method of claim 1, further comprising:
receiving transaction data associated with a transaction between the particular customer and the particular merchant;
processing the transaction data, with the trained machine learning model, to determine another interest of the particular customer; and
performing one or more additional actions based on the other interest of the particular customer.

6. The method of claim 5, wherein the transaction data relates to one or more of:
a particular product offered by the particular merchant, or
a particular service offered by the particular merchant.

7. The method of claim 1, wherein restricting use of the website associated with the particular merchant comprises:
preventing the website from displaying products and/or services of the particular merchant that are not related to the interest of the particular customer.

8. A device, comprising:
one or more memories; and
one or more processors communicatively coupled to the one or more memories, configured to:
receive, from a user device, first data identifying a location and a birthdate of a particular customer,
process, with a trained machine learning model, the first data identifying the location and the birthdate of the particular customer to determine a predicted interest of the particular customer,
wherein the trained machine learning model is to identify trends associated with a cluster of customers based on the locations of the customers, the birthdates of the customers, and astrological data associated with the birthdates,
wherein the trained machine learning model is trained with data associated with merchants and customer interest data associated with customers of the merchants, to generate the trained machine learning model,
wherein the data associated with the merchants includes data associated with one or more products of the merchants, and
wherein the customer interest data includes second data identifying:
locations of the customers, and
birthdates of the customers; and
perform one or more actions based on the predicted interest of the particular customer,
wherein, when performing the one or more actions, the one or more processors are configured to one or more of:
restrict use, by the user device, of a website associated with a particular merchant of the merchants;
or
retrain the machine learning model based on an interest of the particular customer.

9. The device of claim 7, wherein the one or more processors are further configured to:
receive social media data associated with the particular customer;
process the social media data, with the trained machine learning model, to determine another interest of the particular customer; and
perform one or more additional actions based on the other interest of the particular customer.

10. The device of claim 7, wherein the one or more processors are further configured to:
receive website activity data associated with the particular customer;
process the website activity data, with the trained machine learning model, to determine another interest of the particular customer; and
perform one or more additional actions based on the other interest of the particular customer.

11. The device of claim 7, wherein the one or more processors are further configured to:
receive one or more of:
transaction data associated with a transaction between the particular customer and the particular merchant,
social media data associated with the particular customer, or
website activity data associated with the particular customer;
process the one or more of the transaction data, the social media data, or the website activity data, with the trained machine learning model, to determine a modification to the predicted interest of the particular customer; and
perform one or more additional actions based on the modification to the predicted interest of the particular customer.

12. The device of claim 7, wherein the machine learning model includes one or more of:
a neural network classifier model,
a long short-term memory (LSTM) model, or
a reinforcement learning model.

13. The device of claim 7, wherein, when performing the one or more actions, the one or more processors are configured to:
provide, to the user device, third data identifying a recommendation for the particular customer and associated with the particular merchant; and
the one or more processors are further configured to:
receive, from the user device, data indicating an interaction with the recommendation;
update the recommendation, to generate an updated recommendation, based on the data indicating the interaction with the recommendation; and
provide, to the user device, fourth data identifying the updated recommendation.

14. The device of claim 7, wherein, when performing the one or more actions, the one or more processors are configured to:
provide, to the user device, third data identifying an offer for the particular customer and associated with the particular merchant; and
the one or more processors are further configured to:
receive, from the user device, data indicating an interaction with the offer;
update the offer, to generate an updated offer, based on the data indicating the interaction with the offer; and
provide, to the user device, fourth data identifying the updated offer.

15. A non-transitory computer-readable medium storing instructions, the instructions comprising:
one or more instructions that, when executed by one or more processors, cause the one or more processors to:
access third-party data associated with merchants,
wherein the third-party data includes data associated with one or more products of the merchants;
access customer interest data associated with customers of the merchants,
wherein the customer interest data includes first data identifying:
locations of the customers, and
birthdates of the customers;
train, with the third-party data and the customer interest data, a machine learning model to generate a trained machine learning model,
the trained machine learning model to identify trends associated with a cluster of customers based on the locations of the customers, the birthdates of the customers, and astrological data associated with the birthdates;
receive, from a user device, second data identifying a location and a birthdate of a particular customer;
process, with the trained machine learning model, the second data identifying the location and the birthdate of the particular customer to determine a predicted interest of the particular customer; and
perform one or more actions based on the predicted interest of the particular customer,
wherein the one or more actions include one or more of:
restrict use, by the user device, of a website associated with a particular merchant of the merchants,
or
retrain the machine learning model based on an interest of the particular customer.

16. The non-transitory computer-readable medium of claim 15, wherein the instructions further comprise:
one or more instructions that, when executed by the one or more processors, cause the one or more processors to:
receive third data identifying an input provided by the particular customer via the user device,
wherein the input is associated with the particular merchant;
process the third data identifying the input provided by the particular customer, with the trained machine learning model, to determine another predicted interest of the particular customer; and
perform one or more additional actions based on the other predicted interest of the particular customer.

17. The non-transitory computer-readable medium of claim 15, wherein the customer interest data further includes one or more of:
social media data associated with the customers,
transaction data associated with the customers, or
website activity data associated with the customers.

18. The non-transitory computer-readable medium of claim 15, wherein the instructions further comprise:
one or more instructions that, when executed by the one or more processors, cause the one or more processors to:
receive transaction data associated with a transaction between the particular customer and the particular merchant;
process the transaction data, with the trained machine learning model, to determine another predicted interest of the particular customer; and
perform one or more additional actions based on the other predicted interest of the particular customer.

19. The non-transitory computer-readable medium of claim 15, wherein the instructions further comprise:
one or more instructions that, when executed by the one or more processors, cause the one or more processors to:
receive social media data associated with the particular customer;
process the social media data, with the trained machine learning model, to determine another predicted interest of the particular customer; and
perform one or more additional actions based on the other predicted interest of the particular customer.

20. The non-transitory computer-readable medium of claim 15, wherein the instructions further comprise:
one or more instructions that, when executed by the one or more processors, cause the one or more processors to:
receive website activity data associated with the particular customer;
process the web site activity data, with the trained machine learning model, to determine another predicted interest of the particular customer; and
perform one or more additional actions based on the other predicted interest of the particular customer.

* * * * *